US012007542B2

(12) United States Patent
Szabó

(10) Patent No.: US 12,007,542 B2
(45) Date of Patent: Jun. 11, 2024

(54) ASSEMBLY FOR SWITCHING OPTICAL PATH AND OPTICAL MICROSCOPE INCLUDING THE ASSEMBLY

(71) Applicant: EÖTVÖS LORÁND TUDOMÁNYEGYETEM, Budapest (HU)

(72) Inventor: Bálint Szabó, Budapest (HU)

(73) Assignee: Eötvös Loránd Tudományegyetem, Budapest (HU)

( * ) Notice: Subject to any disclaimer, the term of this patent is extended or adjusted under 35 U.S.C. 154(b) by 469 days.

(21) Appl. No.: 17/413,010

(22) PCT Filed: Dec. 12, 2019

(86) PCT No.: PCT/HU2019/050055
§ 371 (c)(1),
(2) Date: Jun. 11, 2021

(87) PCT Pub. No.: WO2020/121007
PCT Pub. Date: Jun. 18, 2020

(65) Prior Publication Data
US 2022/0019068 A1 Jan. 20, 2022

(30) Foreign Application Priority Data

Dec. 14, 2018 (HU) .................................. P1800428
Jul. 30, 2019 (HU) .................................. P1900271

(51) Int. Cl.
*G02B 21/00* (2006.01)
(52) U.S. Cl.
CPC ..... *G02B 21/0032* (2013.01); *G02B 21/0048* (2013.01); *G02B 21/0076* (2013.01)

(58) Field of Classification Search
CPC ............ G02B 21/0032; G02B 21/0048; G02B 21/0076; G02B 21/00; G02B 21/0004; G02B 21/002; G02B 21/0036; G02B 21/06; G02B 21/36; G02B 21/361; G02B 21/362; G01N 21/6456; G01N 21/6458; G01N 2021/6463; G01N 2021/6471
(Continued)

(56) References Cited

U.S. PATENT DOCUMENTS 6,683,735 B2    1/2004   Stuckey
9,753,265 B2 *  9/2017   Cooper .................. G02B 21/16
(Continued)

FOREIGN PATENT DOCUMENTS

JP      2015007754 A  *  1/2015
KR      10-1907845 B1    10/2018

*Primary Examiner* — Arnel C Lavarias
(74) *Attorney, Agent, or Firm* — Jason D. Voight

(57) ABSTRACT

An assembly for switching optical paths, which assembly includes multiple optical channels for guiding an illuminating light to a specimen and for guiding the light coming from the specimen to an image recording unit. The assembly also includes a plurality of light guiding mirrors and at least one light modifying element in each optical channel for directing the illuminating light and the light coming from the specimen. In each of the multiple optical channels the at least one light modifying element includes a stationary dichroic mirror. Further details regarding the arrangement and rotation of the mirrors, and how the mirrors direct the illuminating light and light coming from the specimen, are defined herein.

12 Claims, 6 Drawing Sheets

(58) Field of Classification Search
USPC ....... 359/388, 362, 363, 368, 369, 384, 385, 359/387, 389, 390
See application file for complete search history.

(56) References Cited

U.S. PATENT DOCUMENTS

| | | |
|---|---|---|
| 9,964,754 B2 | 5/2018 | Sofka |
| 2003/0214707 A1* | 11/2003 | Engelhardt .......... G02B 21/002 359/368 |
| 2014/0226204 A1 | 8/2014 | Mitzkus et al. |
| 2015/0168713 A1* | 6/2015 | Nowatzyk ............ A61B 3/1025 359/201.2 |

* cited by examiner

ASSEMBLY FOR SWITCHING OPTICAL PATH AND OPTICAL MICROSCOPE INCLUDING THE ASSEMBLY

This is the national stage of International Application PCT/HU2019/050055, filed Dec. 12, 2019.

The present invention relates to optical microscopes, in particular but not exclusively, multi-channel fluorescent microscopes. More particularly, the present invention relates to an assembly for switching optical paths that is configured to switch between a number of optical inspection channels quickly and optionally, in an automated way. The present invention further relates to a multi-channel optical microscope including the above assembly for switching optical paths.

Nowadays optical microscopes are widely spread and used in numerous fields, for example they are used in engineering, medical or scientific applications. Fluorescent microscopes are special optical microscopes that use the light emitted by a specimen for generating image of the specimen. In response to exciting irradiation, certain parts or elements of the specimen emit light with wavelengths different from the wavelength of the excitation, or in response to the excitation, certain parts or elements of the specimen (for example various molecules present in the specimen) emit lights with different wavelengths. So the same specimen can generally be examined by using a plurality of fluorescent wavelengths simultaneously or subsequently. At this kind of selective examination (based on different wavelengths), different parts of the specimen can be used as a basis for image generation through an appropriate mapping and processing of the light emitted by the specimen. In this way, by selective observation of various elements of the specimen, the generated images may have better quality and/or details (higher resolution) from the point of view of the signal-to-noise ratio.

As it is well known in the art, in case of fluorescent microscopes, an appropriate color filter is mostly used to select a component of the light of a broadband light source so that said component have a wavelength optimal for the excitation of the specimen. Such a broadband light source is often built into the microscope for illuminating the specimen. By illuminating the specimen with the component of the selected wavelength, specific elements of the specimen are excited, which then emit light (fluorescent light) corresponding to their wavelength, and this emitted light is guided into the microscope for image generation. The light used for illuminating the specimen and the fluorescent light emitted by the specimen (and carrying information on the specimen itself) are normally subject to a process substantially within the same optical path by means of a compact optical assembly. For separation of the emitted (or reflected) light that is of interest with respect to the image generation, a number of special optical elements, so called dichroic mirrors (i.e. color separation beam splitters) are normally used.

A dichroic mirror (or dichroic filter) is a special optical element that, as a mirror, reflects light of a given first wavelength while passing light of a second wavelength different from the first wavelength. It is usually formed by a transparent plate with a thin metal oxide layer deposited thereon, wherein due to interference, one of the light components is cancelled, whereas the other light component is amplified. Selection of the wavelengths may be precisely determined by adjusting the thickness and the refraction index of the deposited metal oxide layer. Dichroic mirrors operating at specific wavelengths, which efficiently separate the excitation light of a first wavelength and the fluorescent light of a second wavelength, are generally merchandized as a so-called 'filter cube', in which the dichroic mirror is built in a housing having specific dimensions for providing mechanical protection. Generally, in order to improve the image contrast at a specific fluorescent wavelength (i.e. in a given optical channel), such filter cubes further comprise an excitation filter (on the illumination side) and an emission filter (on the specimen side). These filter cubes have a given weight.

For performing multi-channel fluorescent image generation at a plurality of different wavelengths, by means of a single microscope, a number of dichroic mirrors operating at different wavelengths or a number of filter cubes comprising the same dichroic mirrors are obviously necessary. For the sake of easier handling, the aforementioned elements are generally integrated and the thus obtained compact optical assemblies are mounted into a multi-channel fluorescent microscope, in most cases in a replaceable manner.

Such a compact optical assembly is disclosed, for example, in the U.S. Pat. No. 6,683,735 B2 in the form of a disc that can be rotated around an axis by a motor, wherein the dichroic mirrors having different characteristics are arranged within the disc. When the motor is mounted into the fluorescent microscope, for adjusting the actually selected examination channel, the motor rotates the disc around the axis so that a dichroic mirror operating at the wavelength corresponding to the intended optical examination channel be located along the optical path of the microscope.

One of the main drawbacks of such compact optical units used in multi-channel examination is the substantial weight of these units and consequently, the low manipulation speed thereof. The dichroic mirrors, which play a key role in the quality of the fluorescent images, as well as the filter cubes and the multi-channel filter modules comprising dichroic mirrors significantly affect, in particular slow down the working processes of the fluorescent microscopes. In a fluorescent image generation at a specific wavelength, moving the respective dichroic optical element into the optical path of the microscope takes a substantially long time because of the weight of the optical element (irrespective of whether it is to be rotated around an axis or to be translated linearly). This is particularly critical at the automation of the working processes wherein for a systematic selection of the various optical examination channels in a predetermined order, sequentially moving the dichroic optical elements into their respective positions requires the operation of their driving units, e.g. one or more motors. The optical elements are first accelerated to their travel speed by means of one or more motors, and then they are positioned at their travel speed, and for taking the image generation position, they are stopped. In these devices the duration of switching over the channels may reach the order of even a few seconds.

The U.S. Pat. No. 9,964,754 discloses an optical assembly primarily for fluorescent microscopes, wherein the light coming into the optical assembly along a single input optical path is selectively guided into various internal optical channels by means of directing mirrors rotated by a galvanometer. Along each optical path, stationary light modification elements and mirroring elements are arranged. The incident light guided into the selected optical channel passes through some light modification element(s) arranged along the specific optical path, and after reflection on the one or more mirroring elements the light returns to the directing mirror. After reflecting on the directing mirror, the light exits the optical assembly in a direction set by the galvanometer. The light modification elements are primarily formed by light filters that are specifically configured (i) to selectively pass/filter light rays having different wavelengths or polarization states, or (ii) to pass a portion of the incident light and to reflect the remaining portion thereof. The drawbacks of this solution include the substantial number of the light modification/mirroring elements applied in the optical assembly and the almost straight-line arrangement thereof. Beside the directing mirror, at least two mirroring elements and at least one light modifying element is arranged along each selectable internal optical path, which renders the optical switching assembly according to this solution more expensive, more complicated and more voluminous.

It is an object of the present invention to provide an assembly for switching optical paths that eliminates or substantially reduces the aforementioned drawbacks of the prior art solutions.

More particularly, it is an object of the present invention to provide a multi-channel assembly for switching optical paths which allows quick switching between the different optical paths. The assembly is adapted for use in optical microscopes of the reflective type, primarily in fluorescent microscopes. The quick switching between two optical paths should be understood as the switching of a light ray between a first optical path and a second optical path during the operation of the assembly, wherein the switching action typically takes a few milliseconds, preferably 1 to 5 milliseconds, more preferably 1 to 3 milliseconds. The quick switching between the optical paths significantly increases the number of recordings per time unit by a microscope, which is very beneficial in the case of automated microscopes.

It is a further object of the present invention to provide an assembly for switching optical paths, wherein the illuminating light (and generally, the exciting light) used for recording an image of a sample by means of microscope, while using the assembly according to the invention in an optical microscope, preferably a fluorescent microscope, cannot enter into the optical examination channels, and ultimately into the detector/camera receiving the fluorescent light returning from the specimen, or into the eye. One of the advantages of such an arrangement is that the low-intensity fluorescent light coming from the specimen can be better processed and thus the fluorescent images may have better quality (e.g. contrast) from the point of view of the signal-to-noise ratio, which facilitates or improves the analysis of the fluorescent images of the specimen made, in particular, for diagnostic purposes.

It is yet another object of the present invention to provide a multi-channel assembly for switching optical paths that can be built in a compact form, in particular as a stand-alone module. This kind of arrangement may be particularly beneficial in case of the microscopes that have a modular design, where the units of the microscope are arranged in a replaceable manner within the frame of the microscope and they can occasionally be replaced simply and independently of each other.

Accordingly, it is yet another object of the invention to provide a microscope that operates with shorter switching times between the optical paths during the imaging process with respect to the currently available microscopes, in particular the fluorescent microscopes.

The above objects may be achieved by providing an optical switching arrangement, wherein in each optical channel, a respective stationary filter cube with a relatively heavy weight is arranged, and wherein the optical path of the illumination light directed to the specimen and the light beam coming from the specimen carrying information for imaging are selected by rotatable mirroring surfaces having a fix arrangement, preferably a fixed system of planar mirrors, wherein said mirrors have a weight substantially smaller than the weight of the filter cubes and therefore they operate much faster.

The above objects are achieved by providing an assembly for switching optical paths, said assembly comprising multiple optical channels for guiding an illuminating light to a specimen and for guiding the light coming from the specimen to an image recording unit, the assembly further comprising a plurality of light guiding mirrors and at least one light modifying element in each optical channel for directing the illuminating light and the light coming from the specimen. In each of the multiple optical channels, the at least one light modifying element comprises a stationary dichroic mirror. The light guiding mirrors include the following mirrors: a first rotatable light guiding mirror for directing the illuminating light ray to a selected dichroic mirror; a second rotatable light guiding mirror for guiding a light ray reflected by the dichroic mirror to the specimen and for directing a light ray coming from the specimen to the dichroic mirror; and a third stationary light guiding mirror and a fourth rotatable light guiding mirror, wherein the third light guiding mirror directs a light ray passed by the dichroic mirror to the fourth light guiding mirror. A rotating unit is coupled to the first, second and fourth light guiding mirrors, and the rotational axis of said light guiding mirrors align with a common geometric axis. The dichroic mirrors associated with the respective optical channels and the third light guiding mirror are arranged at a predefined angular distance from each other around said geometric axis.

The above objects are further achieved by providing an optical microscope comprising a light source, an objective lens for illuminating a specimen and for receiving light coming from the specimen, an optical switching assembly, a tubular lens mapping the light to be detected, and an image recording unit. The optical microscope is characterized in that the optical switching assembly comprises an assembly for switching optical paths according to the present invention.

The invention will now be described in more detail with reference to the accompanying drawings, in which FIG. 1 schematically illustrates the assembly for switching optical paths, showing only one optical channel as a part of a reflective optical microscope, in particular a fluorescent microscope;

FIG. 2 schematically illustrates a preferred embodiment of the optical switching assembly according to the invention in a longitudinal cross-sectional view depicting a given selected optical path;

Figure 1:
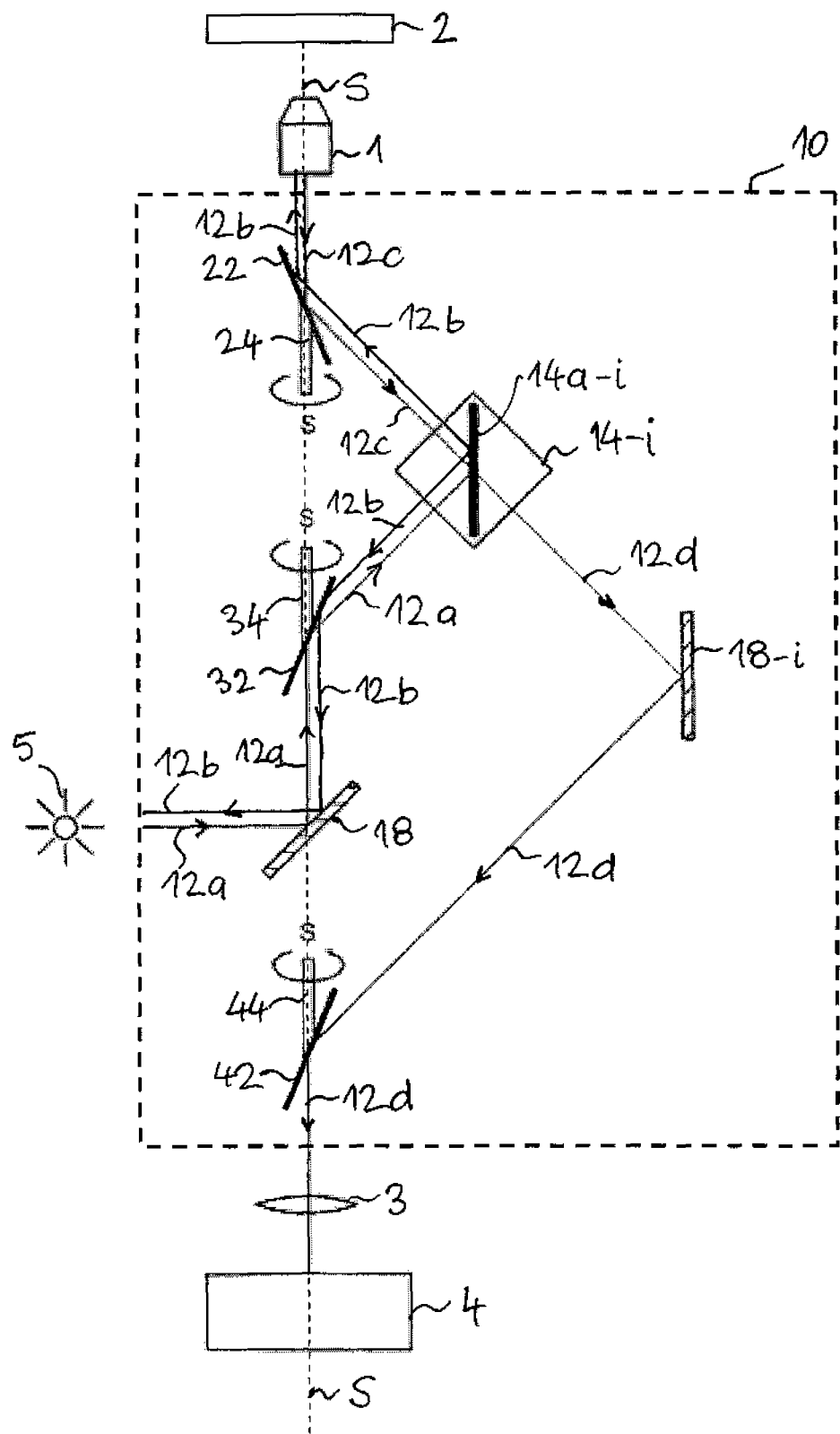

FIG. 1 shows the concept of the multi-channel optical switching assembly 10 according to the invention, wherein the optical switching assembly 10 is illustrated as a part of an optical microscope, and wherein only one optical channel is shown. Preferably, the optical microscope is a fluorescent microscope that is adapted for receiving and mapping the fluorescent light emitted by the illuminated specimen 2 in a way known for a person skilled in the art. Within the optical microscope, the optical paths extend through the optical switching assembly 10 between an objective lens 1 of the optical microscope and a tubular lens 3 thereof, as it is well known for those skilled in the art. The mapping in the optical channel selected by means of the optical switching assembly 10 is carried out by means of an image recording unit, preferably a camera 4, which is arranged downstream the tubular lens 3 along the direction of the light propagation.

FIG. 1 schematically illustrates the optical switching assembly according to the invention and a selected one of its optical channels. Each of the optical channels is provided with light guiding elements and light modification elements, said light guiding elements being adapted to guide the light ray illuminating the specimen 2 (and in a given case, also exciting the specimen) and to guide the light ray reflected from and/or emitted by the specimen 2. The light guiding elements are preferably formed by mirroring surfaces operating according to the rules of the geometric optics, including the guiding mirrors 18, 18-$i$, 22, 32, 42, preferably formed as planar mirrors.

A first group of the mirroring surfaces, in particular the mirrors 22, 32, 42 in the present case, includes mirroring surfaces that are mounted to the shafts 24, 34, 44, respectively, said shafts being arranged on the side of the mirrors opposite to their mirroring surface. The rotating shafts of the mirrors 22, 32, 42 are aligned with a common geometric axis S, around which the mirrors can be rotated in positive/negative directions. Each of the mirroring surfaces is mounted to a respective shaft 24, 34, 44 at a given mounting angle, preferably through a releasable connection. The order of magnitude of the mounting angles can be easily calculated and optimized by a skilled person based on the overall spatial dimensions of the optical switching assembly 10 and the relative position of the light guiding elements with respect to the light modifying elements, as well as the distances therebetween, and said mounting angles may be set to the desired values at a given optical microscope. The mounting angles of the aforementioned mirrors 22, 32, 42 are preferably equal, as it can be seen in FIG. 1. The order of magnitude of the mounting angles will be described later in connection with the specific embodiments. The mirrors 22, 32, 42 of the optical switching assembly 10 are arranged one above the other coaxially along the geometric axis S. The mirroring surfaces are rotated by means of driving units, preferably galvanometric drive or stepping motor, coupled to the shafts 24, 34, 44 of the mirrors 22, 32, 42. The shafts 23, 34, 44 and the associated driving units together form rotating units. The operation of the rotating units may be controlled electronically, preferably by a computer. A galvanometric drive known for those skilled in the art can be purchased, for example, from the company Nanotec Electronic GmbH & Co. KG (Feldkirchen, Germany) and a stepping motor can be purchased, for example, from the company Cambridge Technology (Bedford, MA, USA). An advantage of the galvanometric drive is its high speed, but it has the disadvantage that it can be rotated around its axis generally by up to ±40°. Unlike this, the stepping motor is generally slower, but it allows for the aforementioned mirroring surface to rotate around its axis by 360°, which is particularly beneficial for the optical switching assemblies incorporating multiple optical channels.

Figure 2:
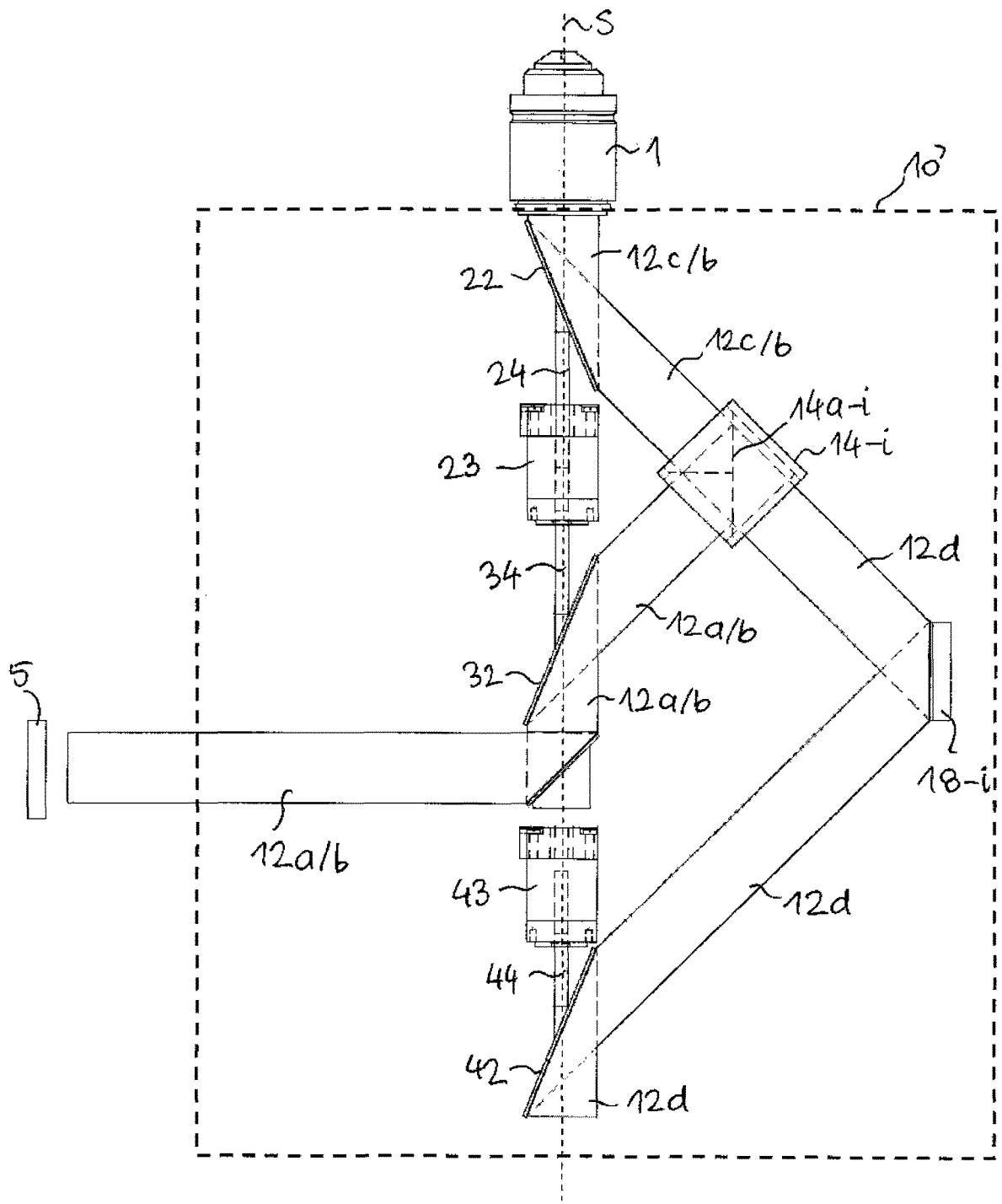
Figure 3:
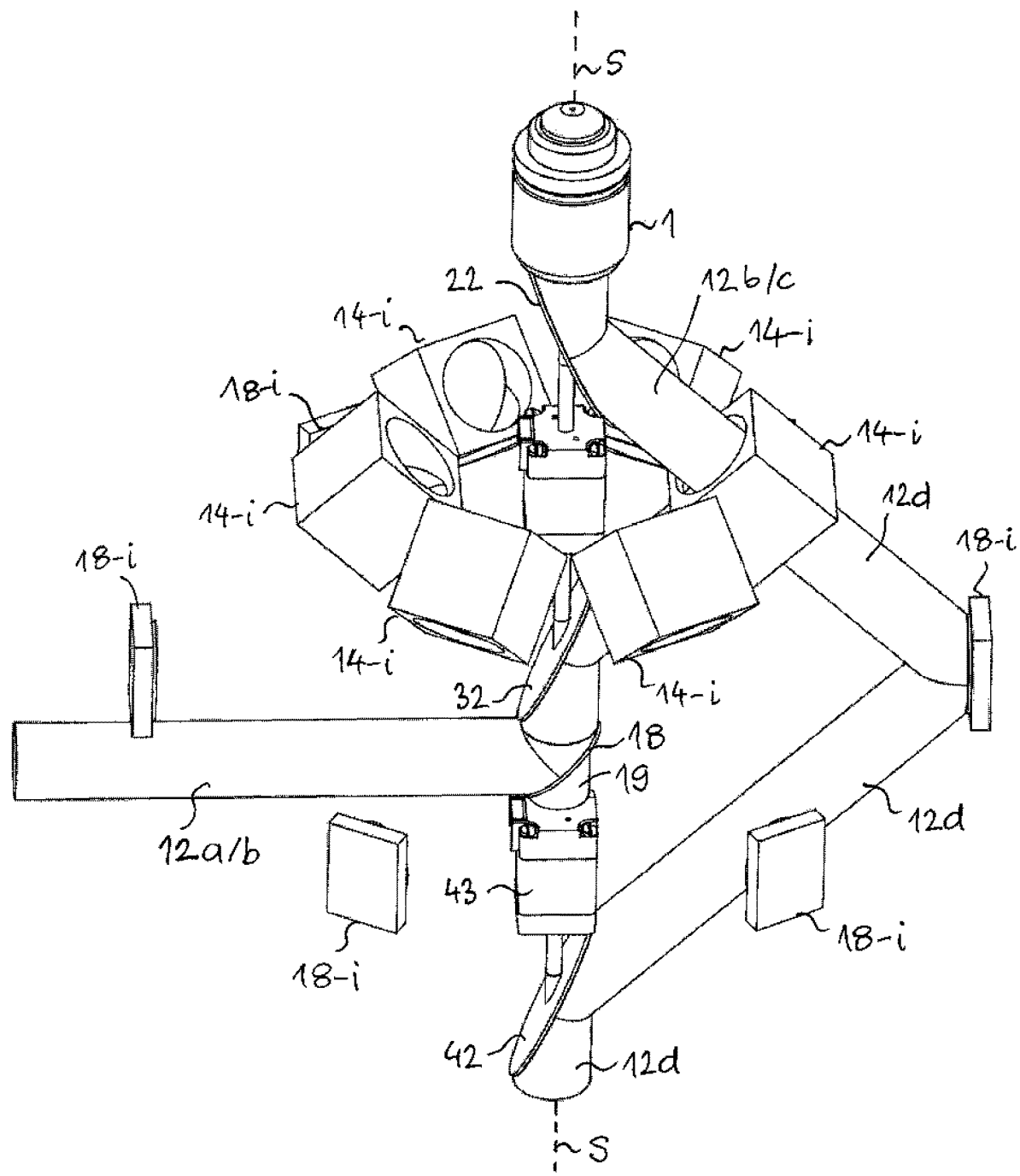
FIG. 3 is a perspective view of a six-channel embodiment of the optical switching assembly according to the invention.

Preferably, the light guiding mirrors 22, 32, 42 are rotatable independently of each other. In this case each mirror 22, 32, 42 is provided with a respective rotating unit. An exemplary embodiment of the optical switching assembly 10, the two upper mirroring surfaces, which are arranged one above the other and rotatable around a common geometric axis S, i.e. the mirrors 22 and 32 shown in FIGS. 1 and 2, are mounted to the opposite ends of a common physical shaft and equipped with a common drive.

The second group of the mirroring surfaces, i.e. the light guiding mirrors 18, 18-$i$ in the present case, includes stationary mirroring surfaces. As it can be seen in FIG. 1, the mirror 18 directs the light ray of an external light source 5 to the mirror 32 of the optical switching assembly 10. In another embodiment of the optical switching assembly 10, the light source may be arranged along the geometric axis S, within a section thereof between the mirrors 32 and 42. In this embodiment, the light source radiates the illumination light ray directly to the mirror 32, so the mirror 18 is unnecessary to use.

Figure 4:
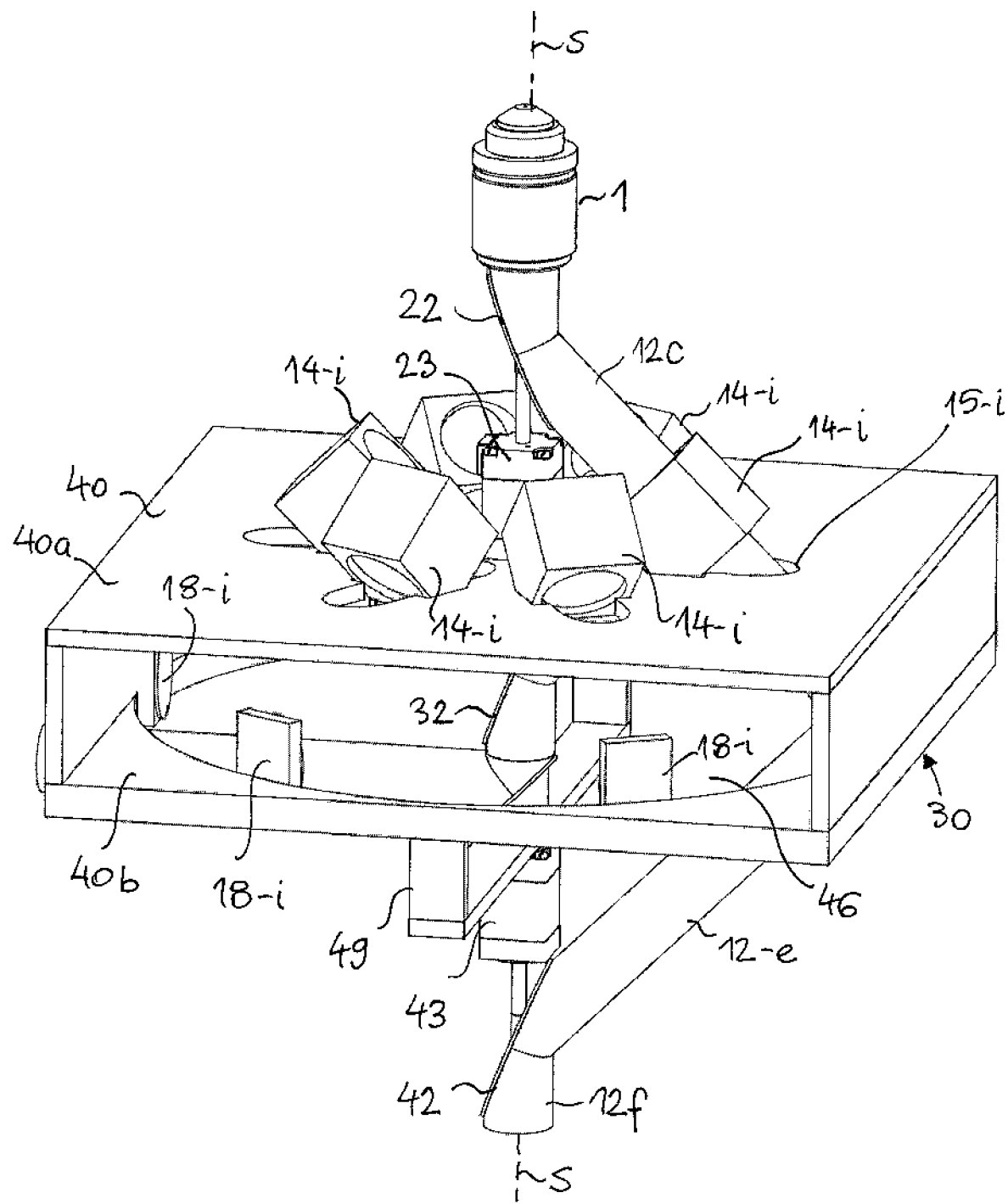
FIG. 4 illustrates the embodiment of the optical switching assembly shown in FIG. 3 wherein the assembly is integrated into a housing that supports the shafts.
Figure 5:
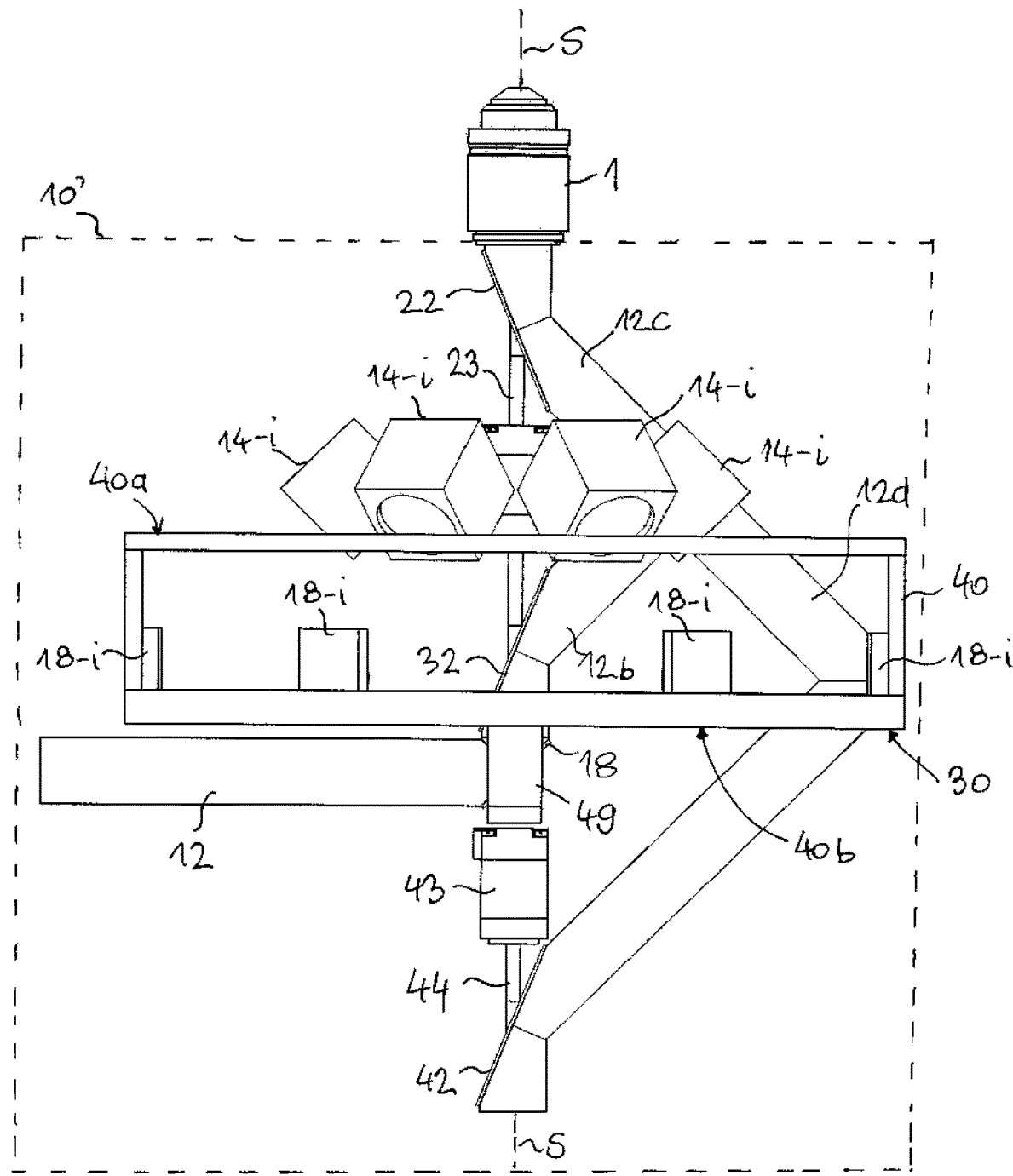
FIG. 5 is a schematic cross-sectional view of the embodiment shown in FIG. 4.

It is preferred that the light source 5 has a wide spectrum. The light source 5 may be arranged adjacent to the optical switching assembly 10, or its light may be guided through an optical fiber to the mirror 18. Preferably, the mirrors 18-$i$ are mounted to the inner side of a housing 40 (see FIGS. 4 and 5) incorporating the optical switching arrangement 10 and providing a mechanical protection for it. The mirrors 18-$i$ are preferably mounted through releasable connections so that the mirroring surfaces can be directed and eventually adjusted and finely tuned when necessary. It is preferred that the mirroring surface of the mirrors 18-$i$ is parallel to the optical axis of the objective lens 1. It is noted that a compact design of the optical switching assembly according to the invention, the optical axis of the objective lens 1 is aligned with a common geometric axis S in the present embodiment of the optical switching assembly 10.

The light modifying elements include one or more optical elements modifying at least one physical property (e.g. wavelength, polarization, intensity, etc.) of the incident light or by a combination thereof. In the present invention, these optical elements are color separation beam splitters, i.e. dichroic mirrors. In some embodiments, filters (color filters) may also be arranged on either side or both sides of the dichroic mirrors for passing/absorbing the light at specific wavelengths or in specific wavelength ranges. It is obvious for a person skilled in the art that depending on the particular application of the optical switching assembly 10, the light guiding elements and the light modifying elements may be formed by numerous optical elements. In case of utilization in a fluorescent microscope, it is particularly advantageous that the light modifying elements used in the optical switching assembly 10 are formed by combined optical elements, so-called filter cubes 14-$i$, that comprise excitation and emission filters and a dichroic mirror 14$a$-$i$ within a common housing. Such a filter cube is available, for example, at the company Chroma Technology (USA).

The filter cubes 14-$i$ used in the embodiment of the optical switching assembly 10 shown in FIG. 1, are configured in a way that the light ray 12$a$ coming from the light source 5 enters the dichroic mirror 14$a$-$i$ at an angle 45°, and thus the light ray 12$b$ reflected by the dichroic mirror 14$a$-$i$, having a specific wavelength and bandwidth, leaves the dichroic mirror 14-$i$ at an angle of 45°. The light ray 12$b$ exiting from the filter cube 14-$i$ reflects on the mirroring surface of the mirror 22 and gets to the specimen 2 through the objective lens 1. In this case the normal of the dichroic mirror 14$a$-$i$ is perpendicular to the optical axis of the objective lens 1, and also to the common geometric axis S. Consequently, in accordance with the rules of the geometric optics, the normal of the rotatable light guiding mirrors 22, 32, 42 forming the mirroring surfaces and the optical axis of the objective lens 1, as well as said normal and the geometric axis S, define an angle of 67.5°, provided that the mounting angle of the mirrors 22, 32, 42 is 22,5°. In the embodiment shown in FIG. 1, the light emitted by the light source 5 enters the mirror 18, forming a stationary mirroring surface, also at 45° and the light ray 12*a* is reflected thereon at an angle of 45°. It means that the normal of the mirror 18 and the optical axis of the objective lens 1, or the common geometric axis S also define an angle of 45°. In this geometric arrangement, the geometric center of the filter cube 14-*i* is at a half way between the mirrors 22 and 32 along the common geometric axis S and resides in a plane aligning to the geometric axis S.

The light ray 12*c*, which comes from the specimen 2 and enters the optical switching assembly 10 through the objective lens 1, one of the components of which is the light ray 12*b* originating from the illumination light beam 12*a*, and one or more other components of which are the light rays reflected from or emitted by the specimen 2, gets into the filter cube 14-*i* after reflection on the mirror 22, and then it enters the stationary mirror 18-*i* at angle of 45° as a light ray 12*d* having a specific wavelength and a specific bandwidth. The light ray 12*d* is passed through the dichroic mirror 14*a-i* having a given shaft orientation. Accordingly, in the present embodiment of the invention, the normal of the mirror 18-*i* and the optical axis of the objective lens 1, as well as said normal and the common geometric axis S, define an angle of 90°, i.e. the normal is perpendicular to both axes. Once reflected on the mirror 18-*i*, the light ray 12*d* enters the mirror surface of light guiding mirror 42, and after a further reflection it passes through the tubular lens 3 of the optical microscope and reaches the image recording unit 4, preferably a camera. By arranging the dichroic mirror 14*a-i* and the rotatable and stationary mirrors along the optical path in such a way, the distance between the objective lens 1 and the tubular lens 3 can be adjusted between a wide range, and if necessary, the optical microscope comprising the optical switching assembly according to the present invention may be made extremely compact.

FIGS. 2 to 5 show an exemplary embodiment of the invention, namely an optical switching assembly 10' comprising more than one, preferably six optical channels. In this embodiment, as it can be seen in the embodiments shown in FIGS. 2 and 4, the optical elements defining the optical channels of a multi-channel arrangement, namely the light guiding elements and the light modifying elements, are secured to a supporting unit 30. The desired optical channel is selected by rotating the mirroring surfaces of the rotatable mirrors 22, 32, 42 in the desired directions around the respective shafts 24, 34, 44. The supporting unit 30 comprises a housing 40 which preferably has a rectangular shape, and on the upper side 40*a* of which a multiple apertures 15-*i* are formed to allow the light to pass through. The filter cubes 14-*i* are secured in these apertures 15-*i* individually, with an appropriate shaft orientation as discussed above. In this case, the appropriate shaft orientation means a shaft orientation for each optical channel which allows the respective filter cube 14-*i* to guide the light ray from the light source toward the specimen and also to guide the light ray from the specimen to the image recording apparatus, for example a camera. The appropriate shaft orientation of the filter cube 14-*i* is defined by the orientation of the optical axis of the dichroic mirror used within the respective filter cube 14-*i*.

The dichroic mirrors 14*a-i* used in the optical channels are preferably secured to the upper side 40*a* of the housing 40 in such a way that they are positioned at an equal angular distance of γ=360°/n around the geometric axis S, where n is the number of the optical channels of the optical switching assembly (in the illustrated embodiment n=6). The dichroic mirrors 14*a-i*, however, may be arranged differently, even at different angular distances γ from each other.

The embodiment of the optical switching assembly 10' shown in FIGS. 2 to 5, as also shown in the schematic view of FIG. 1, the optical axis (or normal) of the dichroic mirrors 14*a-i* is perpendicular to the common optical axis S. The upper side 40*a* of the housing 40 is preferably arranged in such a way that a plane aligning with the geometric center points of the filter cubes 14-*i* also contains the halfway point of the distance between the mirrors 22 and 32 along the common geometric axis S.

Preferably, on the bottom side 40*b* of the housing 40, there is only one light transmitting aperture 46. The mirrors 18-*i* forming the stationary mirroring surfaces applied in the optical channels are mounted on the bottom side 40*b* along the periphery of this light transmitting aperture 46, at an equal angular distances γ=360°/n from each other, preferably around the geometric axis S, where n is the number of the optical examination channels of the optical switching assembly (in the present embodiment n=6), and with a normal perpendicular to the common geometric axis S. The mirrors 18-*i* may have another arrangement as well, they may be arranged even at different angular distances γ from each other, but the arrangement of the mirrors 18-*i* should be in accordance with the arrangement of the dichroic mirrors 14*a-i* for the sake of an appropriate configuration of the optical channels. The driving unit that serves as a common driving of the mirrors 22, 32, i.e. the stepping motor 23 in the present case, is mounted on the upper side 40*a* of the housing 40. The driving shaft ends are positioned at two opposite sides of the upper side 40*a* and they are connected to the respective shaft 24, 34. The stepping motor 43 used as a driving unit of the mirror 42 is mounted to a cross element 49 bridging over the light transmitting aperture 46, wherein the opposite ends of the cross element 49 are connected to the bottom side 40*b* of the housing 40. The cross element 49 preferably extends to a certain distance from the plane of the bottom side 40*b* of the housing 40. This distance is specified so that propagation of the light inside the housing 40 is not disturbed by any mechanical obstacle. Determination of this distance based on the geometric optical path and the elements thereof is a simple routine task for a person skilled in the art.

The rotating units and the driving units incorporated therein (the stepping motors 23, 43 or galvanometric drives used in various other embodiments of the optical switching assembly according to the invention) are operatively coupled to an electronic control unit not shown in the drawings. The control unit, in accordance with the operation of the microscope, controls the switching between the optical channels for selection of the desired channel by properly adjusting the direction of the rotatable light guiding mirrors.

As discussed above, the longitudinal dimension of the optical switching assembly 10' (in the vertical direction in the drawings) is defined, in addition to the diameter of the rays, also by the design of the filter cubes 14-*i* used in the assembly, in particular the orientation of the dichroic mirrors 14*a-i* used in the filter cubes. During the tests, it was experienced that the vertical dimension of the light switching assembly according to the invention may be changed by modifying the configuration of the filter cube 14*a-i*, preferably it can be reduced, and within certain ranges that dimension can be adjusted to a desired value. It is particularly advantageous because the vertical dimension of the light switching assembly can be fitted to the vertical dimension of the chamber configured to receive the optical switching assembly within the framework of the microscope.

Figure 6:
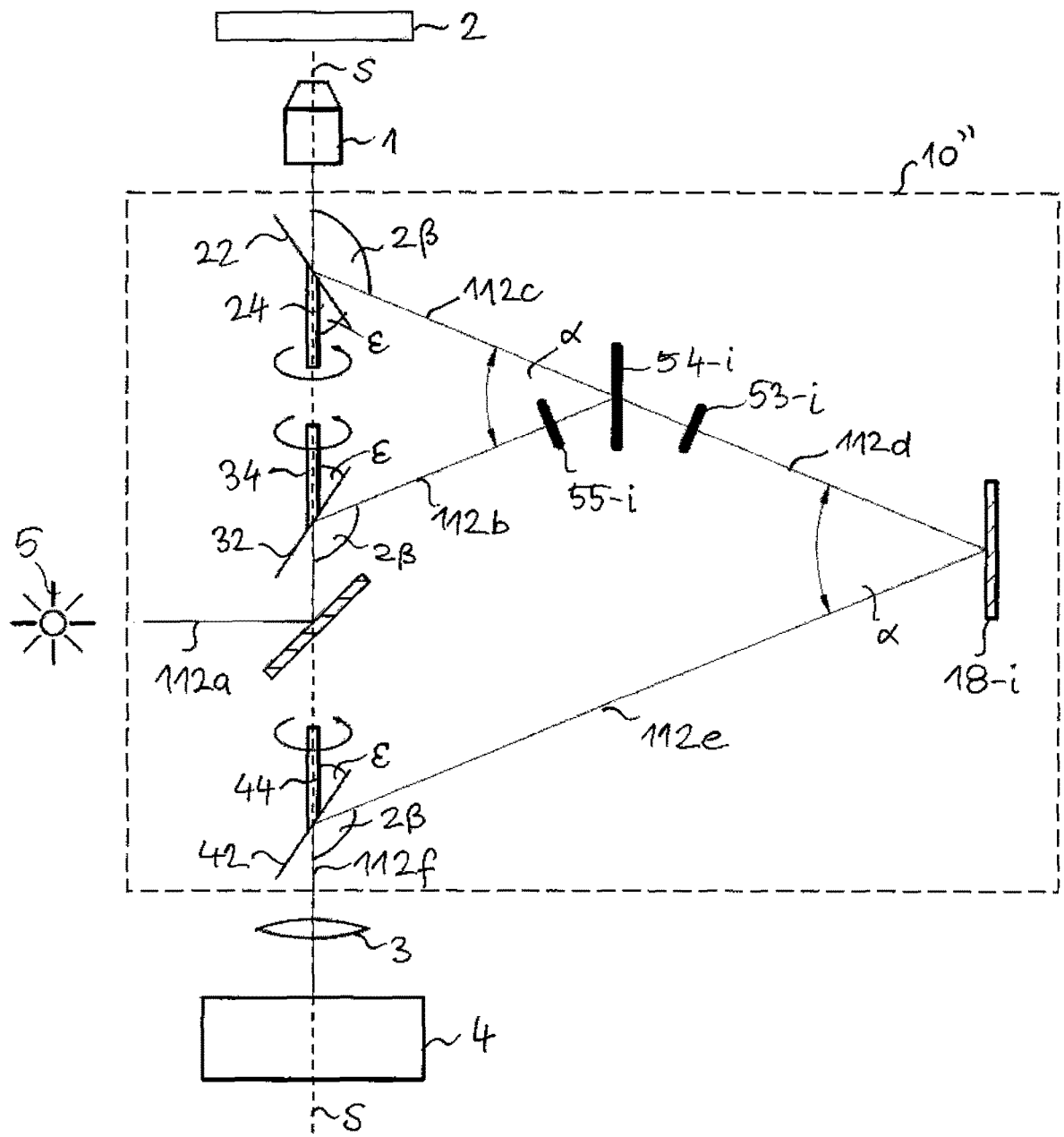
FIG. 6 schematically illustrates another embodiment of the optical switching assembly according to the invention.

FIG. 6 illustrates a schematic view of an optical switching assembly 10″ corresponding to the above mentioned embodiment of the optical switching assembly according to the invention. For the sake of simplicity, only one optical channel is shown in this figure. In FIG. 6, the structural elements that are the same as the structural elements shown in FIGS. 1 to 5, are indicated by the same reference numbers. A key feature of the optical switching assembly 10″ is that the filter cubes of the optical channels are substituted in each optical channel by an excitation filter 55-$i$, a dichroic mirror 54-$i$ and an emission filter 53-$i$ while keeping the geometric properties and the arrangement of the rotatable mirrors and the stationary mirrors unchanged. Accordingly, the shafts 24, 34, 44 supporting the rotatable mirrors 22, 32, 42 are aligned with a common geometric axis S, and furthermore, the mirroring surfaces of the stationary mirrors 18-$i$ are arranged substantially parallel to the geometric axis S. Additionally, the normal of the dichroic mirror 54-$i$ is also perpendicular to the geometric axis S and the geometric center thereof resides at halfway between the mirrors 22 and 32 along the common geometric axis S and resides in a plane perpendicular to the geometric axis S. At the same time, the excitation filter 55-$i$ and the emission filter 53-$i$ are selected on the basis of the properties of the applied dichroic mirror 54-$i$ and the properties of the fluorophore to be used in the specimen 2 for imaging, as it is well known for those skilled in the art.

As shown in FIG. 6, the relations between the angle of incidence $\alpha/2$ at which the light path 112$b$ arrives at the dichroic mirror 54-$i$, or the minimum thereof, as well as the mounting angle $\varepsilon$, at which the mirrors 22, 32, 42 are mounted to the respective shafts 24, 34, 44, and thus the angle of incidence $\beta$, at which the light rays propagating along the light paths 112$a$, 112$b$, 112$c$ enter the rotatable mirrors 22, 32, 42, can all be determined as follows. Based simple geometric considerations, the above mentioned geometric parameters meet the following requirements: $\beta=45°+\alpha/4$ and $\varepsilon=45°-\alpha/4$. Because of the symmetry the angles of incidence and of the angles of departure of the light paths 112$d$, 112$e$, 112$f$ can be determined. Consequently, with a given diameter of the light rays, the vertical dimension of the optical switching assembly 10″ and the minimum thereof can be calculated by those skilled in the art based on the optical properties of the applied dichroic mirror 54-$i$ (particularly based on the angel of incidence $\alpha$). The equations necessary for the computations and the optical spectra of some specific optical filters as a function of the angel of incident can be learned, for example, from Turan Erdogan's work, titled Optical Filters: Non-normal Angles of Incidence (see www.semrock.com). A dichroic mirror 54-$i$, an excitation filter 55-$i$ and an emission filter 53-$i$ for providing a given angle of incidence $\alpha/2$ can be obtained, for example, from the companies Semrock and Chroma (USA).

It is obvious for a person skilled in the art that for supporting certain elements of the stepping motor or the galvanometric driving used in the optical switching assembly 10″, a housing similar to the housing 40 shown in FIGS. 2 to 5 may be used, wherein the housing may be resized on the basis of the geometric optical path and the angle of incidence $\alpha/2$. How to resize the housing is obvious for those skilled in the art, therefore its details are omitted here.

The use of the optical switching assemblies 10, 10′, 10″ according to the invention with the desired number of optical channels therein arranged in the above described configurations allows to construct optical microscopes, in particular fluorescent microscopes, in which the illuminating light does not reach the detector and thus it does not disturb the imaging process that uses the light coming from the specimen.

The microscopes comprising the optical switching assembly according to the invention also provide fast multi-channel image generation since the comparatively heavy-weight light modifying elements of the optical switching assembly 10, 10′, 10″ are stationary and therefore in case of image generation based on the light coming from the specimen with different properties (wavelengths, polarizations, etc.), fast switching can be carried out by moving the rotatable light guiding mirrors between the various optical channels used for imaging.

The invention claimed is:

1. An assembly (10, 10′, 10″) for switching optical paths in an optical microscope, said assembly comprising multiple optical channels for guiding an illuminating light to a specimen and for guiding the light coming from the specimen to an image recording unit, the assembly further comprising a plurality of light guiding mirrors and at least one light modifying element in each optical channel for directing the illuminating light and the light coming from the specimen, characterized in that the light modifying elements comprise a stationary dichroic mirror (14$a$-$i$); and the light guiding mirrors include the following mirrors:

a first rotatable light guiding mirror (32) for directing the illuminating light ray (12$a$) to a selected dichroic mirror (14$a$-$i$), a second rotatable light guiding mirror (22) for guiding a light ray (12$b$) reflected by the dichroic mirror (14$a$-$i$) to the specimen and for directing a light ray (12$c$) coming from the specimen to the dichroic mirror (14$a$-$i$), and multiple third stationary light guiding mirrors (18-$i$), each forming a pair with a respective dichroic mirror (14$a$-$i$) and adapted for reflecting a light ray (12$d$) passing through the respective dichroic mirror (14$a$-$i$), and a fourth rotatable light guiding mirror (42) for directing the light ray (12$d$) reflected by one of the third light guiding mirrors (18-$i$) towards the image recording unit (4);

wherein a rotating unit is coupled to the first, second and fourth light guiding mirrors (32, 22, 42), and a rotational axis of said light guiding mirrors (32, 22, 42) aligns with a common geometric axis (S); and wherein the dichroic mirrors (14$a$-$i$) associated with the respective optical channels and the third light guiding mirrors (18-$i$) are arranged around said geometric axis (S).

2. The assembly (10, 10′, 10″) for switching optical paths according to claim 1, characterized in that the rotating unit is a galvanometric drive.

3. The assembly (10, 10′, 10″) for switching optical paths according to claim 1, characterized in that the rotating unit is a stepping motor.

4. The assembly (10, 10′, 10″) for switching optical paths according to claim 1, characterized in that the first and the second light guiding mirrors (32, 22) are provided with a common rotating unit coupled thereto.

5. The assembly (10, 10′, 10″) for switching optical paths according to claim 1, characterized in that each dichroic mirror (54-$i$) is provided, as additional light modifying elements, with a first filter element (55-*i*) of first wavelength throughput characteristics, said first filter element being arranged one side of the respective dichroic mirror, and a second filter element (53-*i*) of second wavelength throughput characteristics, said second filter element being arranged on an other side of the respective dichroic mirror.

6. The assembly (10, 10', 10") for switching optical paths according to claim 5, characterized in that each dichroic mirror (54-*i*) with the associated first and second filter elements (55-*i*, 53-*i*) together form a filter cube (14-*i*).

7. The assembly (10, 10', 10") for switching optical paths according to claim 1, characterized in that a distance between the second and the fourth light guiding mirrors (22, 42) along the geometric axis (S) is determined by an angle (8) defined by a plane of the light guiding mirrors (22, 32, 42) and said geometric axis (S).

8. The assembly (10, 10', 10") for switching optical paths according to claim 1, characterized in that the dichroic mirrors (14*a*-*i*) associated with the respective optical channels and the third light guiding mirrors (18-*i*) are arranged around said geometric axis (S) at an equal angular distance (γ) from each other.

9. An optical microscope comprising a light source (5), an objective lens (1) for illuminating the specimen (2) and for receiving light coming from the specimen (2), an optical switching assembly, a tubular lens (3) mapping the light to be detected, and the image recording unit (4), characterized in that the optical switching assembly comprises the assembly (10, 10', 10") for switching optical paths according to claim 1.

10. The optical microscope according to claim 9, characterized in that the illuminating light ray (12*a*) is radiated by the light source (5) directly to the first light guiding mirror (32).

11. The optical microscope according to claim 9, characterized in that the illuminating light ray (12*a*) is radiated by the light source (5) to a fifth stationary light guiding mirror (18) that directs the illuminating light (12*a*) to said first rotatable light guiding mirror (32).

12. The optical microscope according to claim 9, characterized in that the image recording unit (4) is a camera.

\* \* \* \* \*